United States Patent

[11] 3,615,765

| [72] | Inventors | Vera Ivanovna Bystrova<br>Petrosky pereulok, 3, kv. 60;<br>Natalia Lavrentievna Polyakova, Stredne-Okhtinsky prospekt 12, kv. 15; Galina Arkhipovna Mikhailova, Liteiny prospekt 46, kv. 13, all of Leningrad, U.S.S.R. |
|---|---|---|
| [21] | Appl. No. | 764,962 |
| [22] | Filed | Oct. 3, 1968 |
| [45] | Patented | Oct. 26, 1971 |

[54] GLAZE FOR CERAMIC PARTS AND ARTICLES
2 Claims, No Drawings

[52] U.S. Cl. ........................................ 106/48, 106/45, 106/52
[51] Int. Cl. ........................................ C03c 3/04, C04b 33/00, C03c 5/02
[50] Field of Search .................................. 106/48, 46, 45, 52

[56] References Cited
UNITED STATES PATENTS
3,380,838  4/1968  Sack .............................. 106/48

*Primary Examiner*—Robert D. Edmonds
*Attorney*—Waters, Roditi, Schwartz & Nissen ABSTRACT: A glaze is proposed which retains its strength and high dielectric properties during the process of metallization of ceramic parts and articles. The glaze contains by weight about 57–65 percent $SiO_2$, 20–27 percent $Al_2O_3$, 5–6.6 percent MgO, 9–12 percent $K_2O+Na_2O$, and 0.5–1.5 percent CaO.

GLAZE FOR CERAMIC PARTS AND ARTICLES

The present invention relates to glazes for coating ceramic parts, preferably, high-alumina articles subjected to metallization and soldering, such as insulators whose coating should comply with strict requirements with respect to dielectric, physical and mechanical properties.

Known in the prior art are glazes for coating ceramic parts and articles, said glazes being based on $SiO_2$, $Al_2O_3$, CaO and MgO in various ratios.

The glazes based on these components may be boron-containing, nonalkali and low-alkali with the content of alkali not exceeding 4percent (such glazes are described, for example, in the article by J.C. Juhl "How to Glaze and Metallize Ceramic Components" in the journal "Ceramic Age," Aug. 1961, vol. 77, No. 8, page 49).

It is also known that none of the prior art glazes is capable of producing high-quality coatings on ceramic parts and articles to be soldered or metallized.

The volatile components of the materials used for metallization and soldering as well as the medium in which these processes are carried out have an adverse effect on the quality of the coating. High temperatures of the glazing, metallization or soldering processes cause the above components as well as the media, to attack the glaze so that they destroy the coatings that have already been made or prevent the formation of a high-quality coating if the glazing is effected after the metallization process.

Under these conditions, the coating layer has a friable porous structure of an uneven thickness, and this results in poor dielectric, physical and mechanical properties of such a coating. Furthermore, these coatings turn out to be unevenly colored, and this fact spoils the appearance of the article from a commercial standpoint.

The most intense coloring is observed on the nonalkali glazes due to adsorption of coloring agents from the furnace atmosphere and formation of colored silicates and aluminates in the glaze.

The glazes containing boron are destroyed during the process of metallization due to the reaction between $B_2O_3$ and water vapors of the gas medium.

An object of the present invention is to eliminate the above-mentioned disadvantages of the glaze coatings.

It is known that, up to the present time, in order to produce a high-quality glaze coating, the operating conditions of the metallization and soldering have been varied by changing the composition of the gas medium used in the process; namely, by using a neutral medium (nitrogen), the impurities in the form of $O_2$ and $H_2$ being allowed in an amount not over 0.02 and 0.03 percent, respectively. The humidity of the medium is also strictly regulated.

This resulted in a considerable deterioration of the metallization and soldering characteristics because of poor adhesion of the metallized layer or solder to the article as well as a loose structure of the metallized layer.

Furthermore, it is rather complicated and burdensome to carry out the process of metallization under such strict operating conditions.

The principal object of the invention is to choose such a ratio of the glaze components as to provide minimum viscosity of the glaze at the temperature of its metallization or fusion and the fullest possible dissolution and volatilization of the coloring metal impurities which have settled from the furnace atmosphere at the moment the glaze softens.

This object is attained by providing a glaze for ceramic parts containing, in per cent: $SiO_2$ from 57 to 65; $Al_2O_3$ from 20 to 27; $K_2O+Na_2O$ from 9 to 12; MgO from 5 to 6.6; and CaO from 0.5 to 1.5.

An increased content of $K_2O+Na_2O$ and MgO in the glaze reduces its viscosity and this, in turn at a high content of alkalis provides conditions for maximum complete dissolution and volatilization of the metallization coloring agents depositing from the furnace atmosphere under the action of $K_2O+Na_2O$.

In order to provide a coating with the best physical, mechanical and dielectric properties, it is advisable to maintain the content of CaO within the range of 0.7 to 1.0 percent.

A detailed description of the invention illustrated by some concrete examples is given hereinbelow.

The glaze can be prepared either by mixing pure oxides or on the basis of a charge composed of natural raw materials.

In the last case, the raw components are taken in the following quantities, in percent:

| | |
|---|---|
| feldspar | 71–80 |
| bentonite | 2 |
| alumina | 7–12 |
| talc | 15–18 |

Further preparation of the glaze is effected by the conventional process, i.e. the charge is melted in glassmaking-type furnaces at a temperature of 1,400°–1,500° C., the melt is poured into cold water and the granules thus produced are ground in conventional mills to a powder of the necessary fineness. In this form, the glaze is ready to be applied onto the surface of articles.

The glaze may be applied onto the surface of the article by any known method, for example, by mixing the glaze with soluble glass and spraying the mixture with the help of an atomizer.

After applying the glaze onto the surface of the article, it is fused at a temperature of 1,280°–1,320°C., to create a smooth lustrous surface.

The article can be glazed either prior to or after the metallization. It depends on the material used in metallization or rather on temperature of metallization as determined by the quality of the metal or alloy employed. It also depends on the quality of the ceramic material of the article.

If the temperature of metallization is lower than the temperature necessary for surface fusion of the glaze, the glazing process should be carried out prior to metallization, and fusion of the glaze in this case is to be effected in electric furnaces.

If the temperature of metallization is higher than 1,380° C., the glaze is applied to the metallized articles, whereas fusion is effected in furnaces with the hydrogen atmosphere under which the metallization has been carried out.

In any case, the operating conditions of the metallization process should correspond to those which provide for the most favorable process conditions as well as for the best quality of the metallization layer.

Examples illustrating the preparation of glazes having different compositions, processes of glazing articles by these glazes, and physical and mechanical properties of the articles after the glazing are given below.

EXAMPLE 1.

For the preparation of a charge the following natural raw materials are taken, in percent:

| | |
|---|---|
| feldspar | 71 |
| talc | 15 |
| bentonite | 2 |
| alumina | 12 |

The charge is prepared by having recourse to the wet grinding of the above components in ball mills. The prepared charge is melted in glassmaking-type furnaces at a temperature within a range of 1,400°–1,500° C.; thereafter the melt is poured into cold water, and the granules thus produced are ground in ball mills until powder of a suitable fineness is obtained.

The glaze powder produced has the following composition, in percent:

| | |
|---|---|
| $SiO_2$ | 57.5 |
| $Al_2O_3$ | 27 |
| $Fe_2O_3$ | 0.26 |
| MgO | 5.48 |

| | |
|---|---|
| CaO | 0.76 |
| Na₂O+K₂O | 9 |

Fe₂O₃ is an unavoidable impurity occurring during the glaze making with the use of the above charge; however, such a minute amount of this admixture cannot have an adverse effect on the quality of the article.

The glaze powder is mixed with soluble glass in the following percent ratio:

| | |
|---|---|
| glaze powder | 42 |
| 50% aqueous solution of soluble glass | 8.5 |
| water | 49.5 |

With the aid of an atomizer, the mixture is applied to the premetallized insulators made of high-alumina ceramics containing about 94 percent of $Al_2O_3$.

The metallization is effected by the molybdenum-manganese alloy at a temperature of 1,400° C. in a wet medium composed of nitrogen and hydrogen (at the ratio $H_2:N_2=1:3$).

The surface fusion of the glaze is effected in the furnace with the same hydrogen atmosphere as that under which the metallization was carried out, the temperature being 1,310°±10° C.

The glaze layer obtained on the article is colorless, transparent, lustrous and has no hair cracks. The glazed insulators are characterized by a bending strength within a range of 2,500–3,000 kg./cm.²; a specific volume resistance at 125° C. of $10^{13}$ to $10^{14}$ ohm/cm.³; and a dielectric power factor at 20° C. of $(3-4)10^{14}$.

After testing the glazed insulators during a period of 56 days in a chamber at a temperature of 40–45° C. and a relative humidity of 98 percent, the insulators retain the above-mentioned properties.

EXAMPLE 2.

The glaze is prepared of a charge having the following composition in percent:

| | |
|---|---|
| feldspar | 73 |
| talc | 18 |
| bentonite | 2 |
| alumina | 7 |

The charge and glaze are prepared by the same procedure as described in example 1.

The glaze thus produced has the following composition in percent:

| | |
|---|---|
| SiO₂ | 61 |
| Al₂O₃ | 22.15 |
| Fe₂O₃ | 0.3 |
| MgO | 6.6 |
| MgO | 6.6 |
| CaO | 0.78 |
| Na₂O+K₂O | 9.18 |

The glaze is applied in the same way as described in example 1 to insulators of high-alumina ceramics containing about 74 percent $Al_2O_3$ after metallization.

The insulators are metallized with a molybdenum-manganese alloy in the furnace with the hydrogen atmosphere at a temperature of 1,270°±10° C. in the hydrogen-nitrogen medium (as described in example 1).

The surface fusion of the glaze is effected in an electric furnace at a temperature of 1,310°±10° C.

The glaze layer is colorless, transparent, lustrous, and has no hair cracks.

The glazed insulators have the following characteristics: the bending strength is within a range of 2,100–2,400 kg./cm.²; the specific volume resistance at 125° C. is $10^{12}$ to $10^{13}$ ohm/cm.³; the dielectric power factor at 20° C. is $(11-12) \cdot 10^{14}$.

The 56-day tests of the glazed articles carried out at a temperature of 40°–50° C. and relative humidity of up to 98 percent demonstrated that the articles have retained their initial properties.

We claim:

1. A glaze for ceramic parts and articles, containing in percent by weight: SiO₂, 57 to 65; Al₂O₃, 20 to 27; MgO, 5 to 6.6; K₂O + Na₂O, 9 to 12; CaO, 0.5 to 1.5.

2. A glaze, according to claim 1, containing CaO in an amount of 0.7 to 1 percent.

* * * * *